US012433821B1

(12) United States Patent
Fan et al.

(10) Patent No.: US 12,433,821 B1
(45) Date of Patent: Oct. 7, 2025

(54) ELONGATED VIBRATION MASSAGE DEVICE

(71) Applicant: Dongguan Chaodian E-commerce Co., Ltd., Dongguan (CN)

(72) Inventors: Zhexin Fan, Dongguan (CN); Yumei Wen, Dongguan (CN)

(73) Assignee: Dongguan Chaodian E-commerce Co., Ltd., Dongguan (CN)

( * ) Notice: Subject to any disclaimer, the term of this patent is extended or adjusted under 35 U.S.C. 154(b) by 0 days.

(21) Appl. No.: 19/015,783

(22) Filed: Jan. 10, 2025

(30) Foreign Application Priority Data

Nov. 8, 2024 (CN) ......................... 202422718681.7

(51) Int. Cl.
*A61H 23/02* (2006.01)

(52) U.S. Cl.
CPC ....... *A61H 23/02* (2013.01); *A61H 2201/169* (2013.01)

(58) Field of Classification Search
CPC .... A61H 23/02; A61H 23/00; A61H 23/0254; A61H 2201/169
See application file for complete search history.

(56) References Cited

U.S. PATENT DOCUMENTS 3,451,391 A * 6/1969 Tavel ..................... A61H 19/44 601/72
3,874,373 A * 4/1975 Sobel ..................... A61H 19/34 601/112
4,788,983 A * 12/1988 Brink ................. A61B 5/02438 600/519
7,510,537 B2 * 3/2009 Imboden ............ A61H 23/0263 600/38
9,144,531 B2 * 9/2015 Topolovac ............. A61H 19/30
12,036,172 B1 * 7/2024 Liu ........................ A61H 23/02
2004/0193079 A1 * 9/2004 Siddhartha ............. A61H 19/50 601/72
2006/0270954 A1 * 11/2006 Tumey ............... A61H 23/0263 601/67
2007/0118058 A1 * 5/2007 Isshiki ................... A61H 19/34 601/80

(Continued)

FOREIGN PATENT DOCUMENTS

EP 2796125 A1 * 10/2014 ............. A61B 90/98

*Primary Examiner* — Tu A Vo
*Assistant Examiner* — Kelsey E Baller
(74) *Attorney, Agent, or Firm* — Hemisphere Law, PLLC; Zhigang Ma

(57) ABSTRACT

An elongated vibration massage device includes a power supply assembly, a long sleeve, a conductive assembly, a vibration shell, a motor, an elongated component, a composite wire rope and a wire rope; the long sleeve is installed at a front end of the power supply assembly, the conductive assembly is installed inside the long sleeve, the vibration shell is installed at a front end of the long sleeve, the motor is installed inside the vibration shell, the composite wire rope includes a wire rope and a conductive wire, the power supply assembly transmits electric energy to the motor through the conductive assembly, and the elongated component is installed at a front end of the vibration shell. The motor is located at the approximate front end of the device, thus the vibration of the motor can be better transmitted to two ends to ensure the use effect of the device.

8 Claims, 5 Drawing Sheets

(56) References Cited

U.S. PATENT DOCUMENTS

| | | | | |
|---|---|---|---|---|
| 2007/0260210 A1* | 11/2007 | Conroy | A61H 19/44 | 604/385.18 |
| 2008/0119767 A1* | 5/2008 | Berry | A61H 21/00 | 601/46 |
| 2008/0139980 A1* | 6/2008 | Fladl | A61H 19/32 | 601/70 |
| 2011/0263396 A1* | 10/2011 | Hung | A63B 23/20 | 482/124 |
| 2023/0310262 A1* | 10/2023 | Crozier | A61H 19/50 | 600/38 |
| 2024/0074939 A1* | 3/2024 | Conroy | A61H 23/02 | |

* cited by examiner

ELONGATED VIBRATION MASSAGE DEVICE

CROSS-REFERENCE TO RELATED APPLICATION

This application claims priority to Chinese Patent Application No. 2024227186817, filed Nov. 8, 2024, which is herein incorporated by reference in its entirety.

TECHNICAL FIELD

The disclosure relates to the field of massage products, in particular to an elongated vibration massage device.

BACKGROUND

In the prior art, for a massage product with a long size, a motor is arranged at an end of the massage product, when the motor vibrates, because a transmission distance is too long, the vibration will be greatly attenuated and weakened when it is transmitted to the other end, and the vibration amplitude will become smaller and the massage effect will become worse. Moreover, the elongated vibration massage device in the prior art has complex structural design, and its front and rear parts cannot be disassembled, so that the universality is poor.

SUMMARY

In view of the above defects in the prior art, the disclosure provides an elongated vibration massage device which can avoid the weakening of motor vibration effect due to long distance, and the specific technical scheme is as follows.

An elongated vibration massage device includes a power supply assembly, a long sleeve (also referred to as sleeve), a conductive assembly, a vibration shell, a motor, an elongated component, a composite wire rope and a wire rope; and the long sleeve is installed at a front end of the power supply assembly, the conductive assembly is installed inside the long sleeve, the vibration shell is installed at a front end of the long sleeve, the motor is installed inside the vibration shell, the composite wire rope includes a wire rope and a conductive wire, the power supply assembly is configured to transmit electric energy to the motor through the conductive assembly and the conductive wire, and the elongated component is connected to a front end of the vibration shell through the wire rope.

In an embodiment, the power supply assembly includes a battery box, a female pin holder, a female pin, a battery, and a control board; the female pin holder, the battery and the control board are sequentially installed in the battery box from front to back in that order; and the female pin is installed inside the female pin holder, the female pin is electrically connected with the battery, and the battery is electrically connected with the control board.

In an embodiment, the power supply assembly further includes a cover, a gasket, a fixed seat and a soft rubber button (also referred to as rubber button), a rear part of the battery box is threadedly connected with the cover, the gasket is disposed between the battery box and the cover, the fixed seat and the soft rubber button are installed in the cover, the fixed seat abuts against the control board, and the soft rubber button partially extends from a rear part of the cover.

In an embodiment, an outer diameter of a rear end of the long sleeve is larger than an outer diameter of the front end of the long sleeve.

In an embodiment, the conductive assembly includes a male pin holder and a male pin, the male pin holder is installed at the rear end of the long sleeve and inside the long sleeve, the male pin is installed inside the male pin holder, the male pin partially protrudes from the rear end of the male pin holder, the male pin is electrically connected with an end of the conductive wire, and the other end of the conductive wire extends into the vibration shell to be electrically connected with the motor.

In an embodiment, the long sleeve is a silicone sleeve.

In an embodiment, the vibration shell has a hollow structure, the motor is disposed inside the vibration shell, the front end of the vibration shell is threadedly connected with a front end cover, and a rear end of the vibration shell is threadedly connected with a rear end cover.

In an embodiment, a front end of the front end cover is fixedly penetrated with the wire rope, and a middle of the elongated component is internally connected with the wire rope.

In an embodiment, a spacer is installed at a pin on the rear part of the motor, and another spacer is installed at a front end of the conductive wire.

The beneficial effects of the disclosure are as follows: compared with the prior art, the main improvement of the elongated vibration massage device of the disclosure is that the motor is installed inside the vibration shell, and the vibration shell is located between the long sleeve and the elongated component, that is, the motor is located at the approximate front end of the whole elongated vibration massage device, so that the vibration of the motor can be better transmitted to two ends to ensure the use effect of the massage device.

DETAILED DESCRIPTION OF EMBODIMENTS

Figure 1:
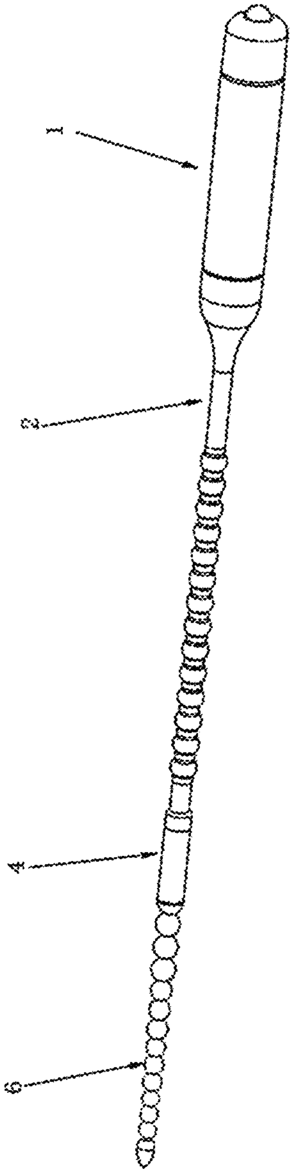
FIG. 1 illustrates a schematic structural diagram of an elongated vibration massage device of the disclosure.
Figure 2:
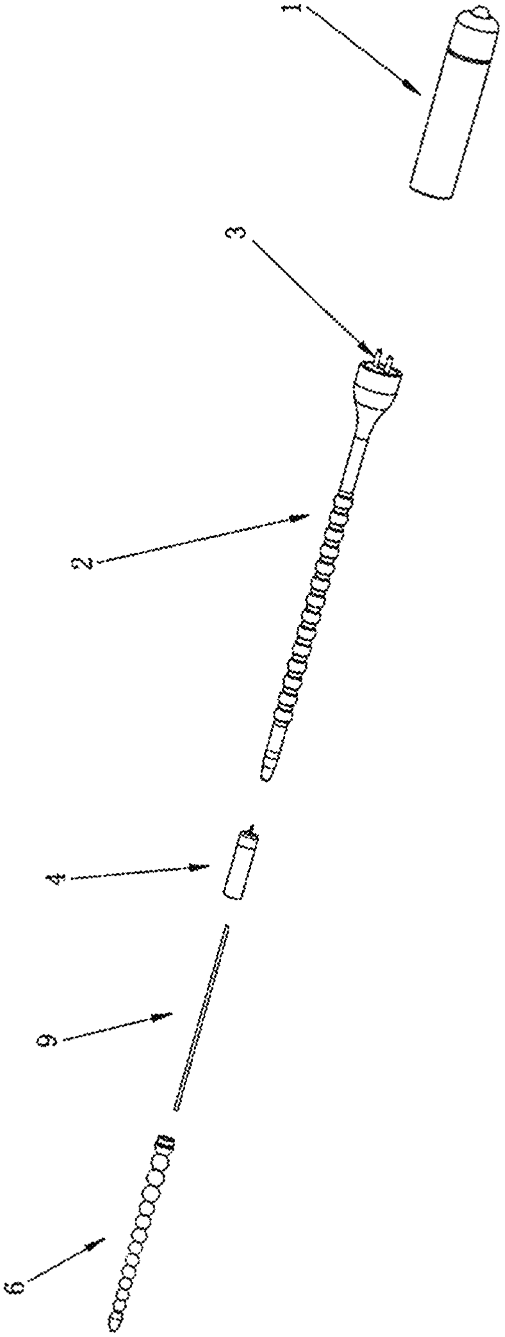
FIG. 2 illustrates a schematic exploded diagram of the elongated vibration massage device of the disclosure.

The specific embodiments of the disclosure will be further explained in conjunction with the accompanying drawings.

In the description of the disclosure, it should be noted that terms such as "center", "up", "down", "left", "right", "vertical", "horizontal", "in", and "out" refer to the directions or positional relationships as shown in the accompanying drawings. These terms are used solely for the purpose of describing the disclosure and simplifying the description, and do not indicate or imply that the devices or components referred to must have specific orientations or be constructed and operated in specific directions. Therefore, they should not be understood as limitations on the disclosure.

In the description of the disclosure, it should be noted that unless otherwise specifically defined and limited, terms such as "installed", "provided with" and "connected" should be broadly understood. For example, "connected" can mean a rigid connection, a detachable connection, or being formed as one piece; it can be a mechanical connection or an electrical connection; it can be a direct connection or an indirect connection through an intermediary; it can be an internal connection within two components. For those skilled in the art, the specific meaning of the aforementioned terms in the context of the disclosure can be understood based on the specific circumstances.

As shown in FIGS. 1-2 and 7-8, an elongated vibration massage device includes a power supply assembly 1, a long sleeve 2, a conductive assembly 3, a vibration shell 4, a motor 5, an elongated component 6, a composite wire rope 33, a tightening sleeve 21, a tightening sleeve lining 22, and a wire rope 9. The long sleeve 2 is installed at a front end of the power supply assembly 1, the long sleeve 2 is elongated, and the outer diameter of the rear end of the long sleeve 2 is large but the outer diameter of the front end of the long sleeve 2 is small. The conductive assembly 3 is installed inside the long sleeve 2, the vibration shell 4 is installed at the front end of the long sleeve 2, and the motor 5 is installed inside the vibration shell 4. The composite wire rope 33 includes the wire rope 9 and a conductive wire 23, the conductive wire 23 is a wire with an insulating layer on the outer layer and a metal inside. The conductive wire 23 is parallel to the wire rope 9. The power supply assembly 1 transmits electric energy to the motor 5 through the conductive assembly 3 and the conductive wire 23. The elongated component 6 is installed at the front end of the vibration shell 4, and the front end of the vibration shell 4 is connected to the elongated component 6 through the wire rope 9.

Figure 3:
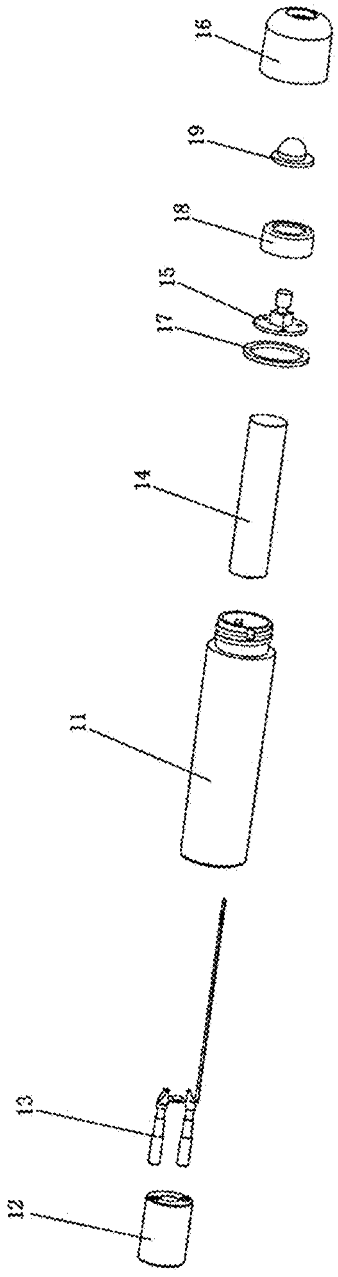
FIG. 3 illustrates a schematic exploded diagram of a power supply assembly of the disclosure.
Figure 4:
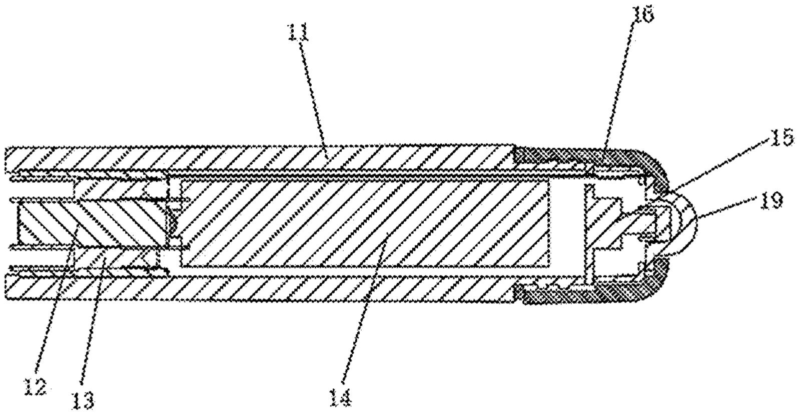
FIG. 4 illustrates a schematic sectional diagram of the power supply assembly of the disclosure.

As shown in FIGS. 3 and 4, the power supply assembly 1 includes a battery box 11, a female pin holder 12, a female pin 13, a battery 14, a control board 15, a cover 16, a gasket 17, a fixed seat 18 and a soft rubber button 19. The female pin holder 12, the battery 14 and the control board 15 are sequentially installed in the battery box 11 from front to back in that order, the female pin 13 is installed in the female pin holder 12, and the female pin 13 has a hole to facilitate the insertion of a male pin. The female pin 13 is electrically connected with the battery 14, and the battery 14 is electrically connected with the control board 15. The rear part of the battery box 11 is threadedly connected with the cover 16, and the gasket 17 is disposed between the battery box 11 and the cover 16 to prevent water from entering the battery box 11. The fixed seat 18 and the soft rubber button 19 are installed in the cover 16. The fixed seat 18 abuts against the control board 15, and the soft rubber button 19 partially extends from the rear part of the cover 16. Pressing the soft rubber button 19 can trigger the corresponding button on the control board 15 to supply power to the motor.

Figure 5:
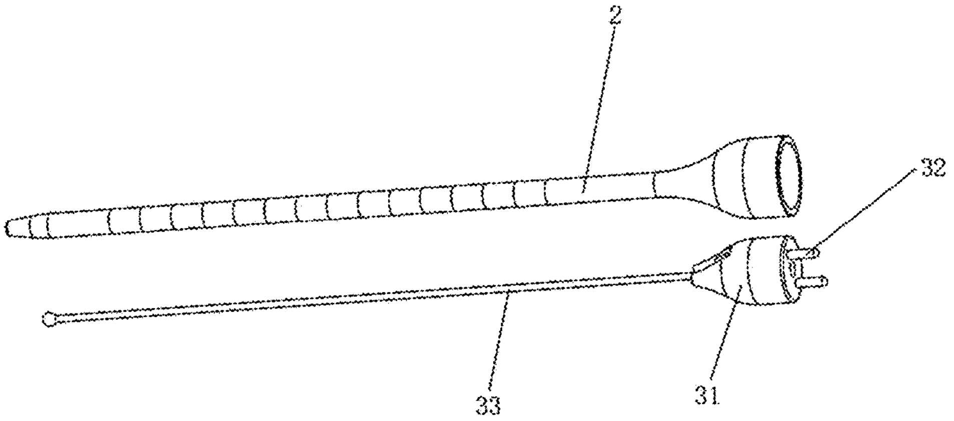
FIG. 5 illustrates a schematic structural diagram of a long sleeve and a conductive assembly of the disclosure.

As shown in FIG. 5, the conductive assembly 3 includes a male pin holder 31 and a male pin 32. The male pin holder 31 is installed at the rear end of the long sleeve 2 and inside the long sleeve 2, the male pin 32 is installed inside the male pin holder 31, and the male pin 32 partially protrudes from the rear end of the male pin holder 31, which can be inserted into or pulled out of the hole of the female pin 13. The composite wire rope 33 is installed inside the long sleeve 2, and the male pin 32 is electrically connected with an end of the conductive wire, and the other end of the conductive wire extends into the vibration shell 4 to be electrically connected with the motor 5. In addition, the long sleeve 2 is a silicone sleeve, which can provide sufficient resilience.

Figure 6:
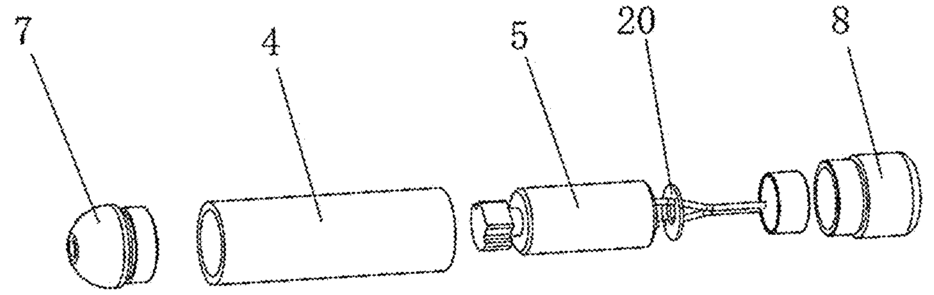
FIG. 6 illustrates a schematic structural diagram of a vibration shell of the disclosure.
Figure 7:
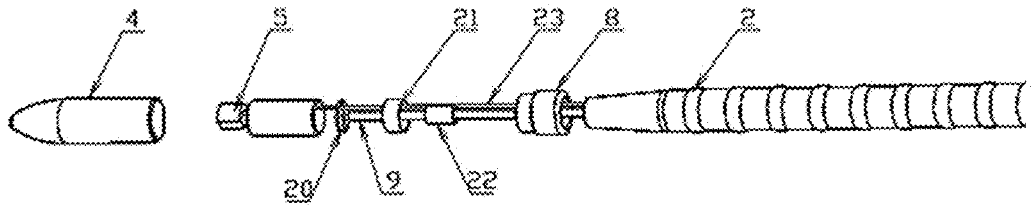
FIG. 7 illustrates a schematic exploded diagram of the elongated vibration massage device of the disclosure.
Figure 8:
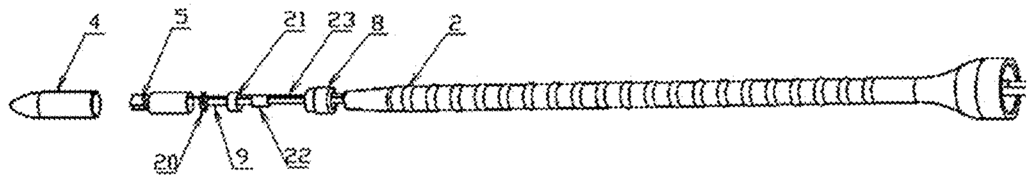
FIG. 8 illustrates a schematic exploded diagram of the elongated vibration massage device of the disclosure.

As shown in FIG. 6, the vibration shell 4 has a hollow structure, and the motor 5 is disposed inside the vibration shell 4. The motor 5 is a vibration motor. The front end of the vibration shell 4 is threadedly connected with a front end cover 7, and the rear end of the vibration shell 4 is threadedly connected with a rear end cover 8. The front end of the front end cover is fixedly penetrated with the wire rope 9, and the middle of the elongated component 6 is internally connected with the wire rope 9. The front end of the long sleeve 2 is inserted into the hole of the front end cover 7. In addition, a spacer 20 is installed at the tail pin of the motor, and another spacer 20 is installed at the front end of the conductive wire.

The above content is a further detailed description of the disclosure in combination with the specific preferred embodiments, and it cannot be considered that the embodiments of the disclosure are limited to these descriptions. For those skilled in the related art, some simple deductions or substitutions can be made without departing from the concept of the disclosure, which should be regarded as belonging to the protection scope of the disclosure.

What is claimed is:

1. An elongated vibration massage device comprising a power supply assembly, a sleeve, a conductive assembly, a vibration shell, a motor, an elongated component, a composite wire rope and a wire rope; and wherein the sleeve is installed at a front end of the power supply assembly, the conductive assembly is installed inside the sleeve, the vibration shell is installed at a front end of the sleeve and thereby the sleeve is located between the power supply assembly and the vibration shell, the motor is installed inside the vibration shell, the composite wire rope comprises the wire rope and a conductive wire, the power supply assembly is configured to transmit electric energy to the motor through the conductive assembly and the conductive wire, and the elongated component is connected to a front end of the vibration shell facing away from the sleeve through the wire rope and thereby the vibration shell is located between the elongated component and the sleeve;

wherein the power supply assembly comprises a battery box, a female pin holder, a female pin, a battery, and a control board; the female pin holder, the battery and the control board are sequentially installed in the battery box in that order; and the female pin is installed inside the female pin holder, the female pin is electrically connected with the battery, and the battery is electrically connected with the control board;

wherein the conductive assembly comprises a male pin holder and a male pin, the male pin holder is installed at a rear end of the sleeve and inside the sleeve, the male pin is installed inside the male pin holder, the male pin partially protrudes from a rear end of the male pin holder to electrically connect with the female pin, the male pin is electrically connected with a first end of the conductive wire, and a second end of the conductive wire extends into the vibration shell to be electrically connected with the motor;

wherein the vibration shell has a hollow structure, the motor is disposed inside the vibration shell, the front end of the vibration shell is threadedly connected with a front end cover, and a rear end of the vibration shell is threadedly connected with a rear end cover;

wherein a front end of the front end cover is fixedly penetrated with the wire rope, and a middle of the elongated component is internally connected with the wire rope; and wherein the front end of the vibration shell is connected to the elongated component through the wire rope.

2. The elongated vibration massage device as claimed in claim 1, wherein the power supply assembly further comprises a cover, a gasket, a fixed seat and a rubber button, a rear part of the battery box is threadedly connected with the cover, the gasket is disposed between the battery box and the cover, the fixed seat and the rubber button are installed in the cover, the fixed seat abuts against the control board, and the rubber button partially extends from a rear part of the cover.

3. The elongated vibration massage device as claimed in claim 1, wherein an outer diameter of the rear end of the sleeve is larger than an outer diameter of the front end of the sleeve.

4. The elongated vibration massage device as claimed in claim 1, wherein the sleeve is a silicone sleeve.

5. The elongated vibration massage device as claimed in claim 1, wherein a spacer is installed at a tail pin of the motor, and another spacer is installed at a front end of the conductive wire.

6. The elongated vibration massage device as claimed in claim 1, wherein the composite wire rope further comprises a second wire rope installed inside the sleeve, and the second wire rope is located at a rear end of the vibration shell opposite to the front end of the vibration shell.

7. An elongated vibration massage device comprising a power supply assembly, an elongated sleeve, a conductive assembly, a vibration shell, a motor, an elongated component, a composite wire rope, and a first wire rope;

wherein the power supply assembly comprises a battery box, a first pin holder, a first pin, a battery, and a control board; the first pin holder, the battery and the control board are installed in the battery box, the first pin is installed on the first pin holder and electrically connected with the battery, and the control board is electrically connected with the battery;

wherein the elongated sleeve has a front end and a rear end opposite to each other, the rear end of the elongated sleeve is installed at an end of the power supply assembly;

wherein the conductive assembly is installed inside the elongated sleeve, the conductive assembly comprises a second pin holder and a second pin installed on the second pin holder, the second pin holder is arranged at the rear end of the elongated sleeve, and the second pin is detachably connected with the first pin to form electrical connection;

wherein the vibration shell comprises a front end and a rear end opposite to each other, and the rear end of the vibration shell is installed at the front end of the elongated sleeve;

wherein the motor is installed inside the vibration shell;

wherein the composite wire rope is installed inside the elongated sleeve and comprises a second wire rope and a conductive wire, the conductive wire has a first end and a second end opposite to each other, the first end of the conductive wire is electrically connected with the second pin, the second end of the conductive wire extends through the rear end of the vibration shell into the vibration shell and is electrically connected with the motor; and wherein the elongated component is connected to the front end of the vibration shell through the first wire rope.

8. The elongated vibration massage device as claimed in claim 7, wherein the first pin is a female pin, and the second pin is a male pin.

* * * * *